United States Patent [19]

Bergdolt

[11] 4,029,358

[45] June 14, 1977

[54] REAR DUMP OPERATING MECHANISM

[75] Inventor: Paul F. Bergdolt, Frankenmuth, Mich.

[73] Assignee: General Motors Corporation, Detroit, Mich.

[22] Filed: July 29, 1976

[21] Appl. No.: 709,785

[52] U.S. Cl. ............................ 298/19 B; 298/22 B
[51] Int. Cl.² .......................................... B60P 1/28
[58] Field of Search ............ 298/19 B, 22 B, 22 D, 298/22 R

[56] References Cited

UNITED STATES PATENTS

| 2,034,306 | 3/1936 | Lowdermilk | 298/19 B |
| 2,097,555 | 11/1937 | Anthony | 298/22 D |

*Primary Examiner*—Robert J. Spar
*Assistant Examiner*—George F. Abraham
*Attorney, Agent, or Firm*—Edward J. Biskup

[57] ABSTRACT

An operating mechanism for raising the dump body of a dump truck that includes a linear actuator arranged with its longitudinal axis substantially parallel to the floor of the dump body when the latter is in the lowered-carry position and is connected to a bell crank member for raising the dump body.

3 Claims, 4 Drawing Figures

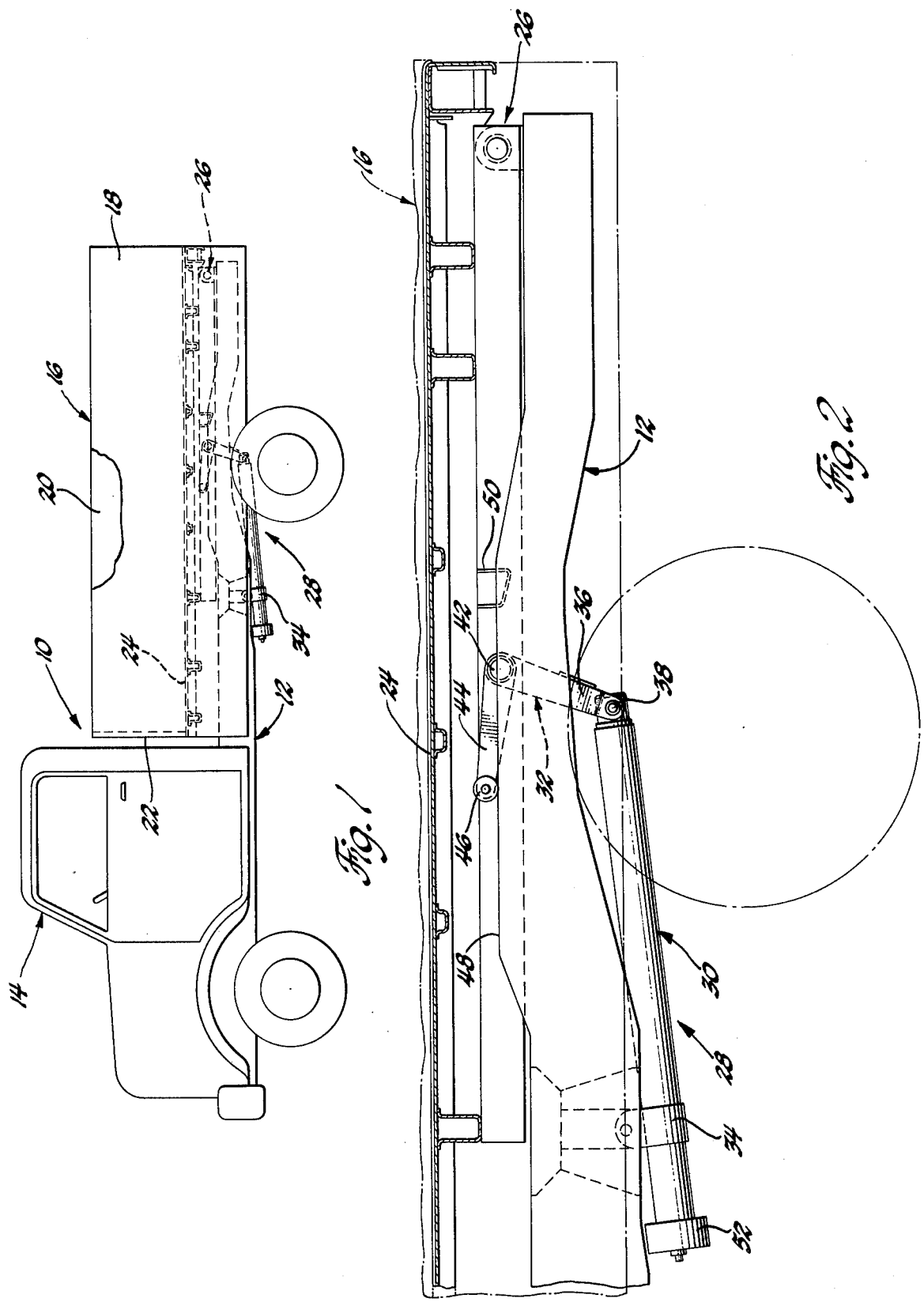

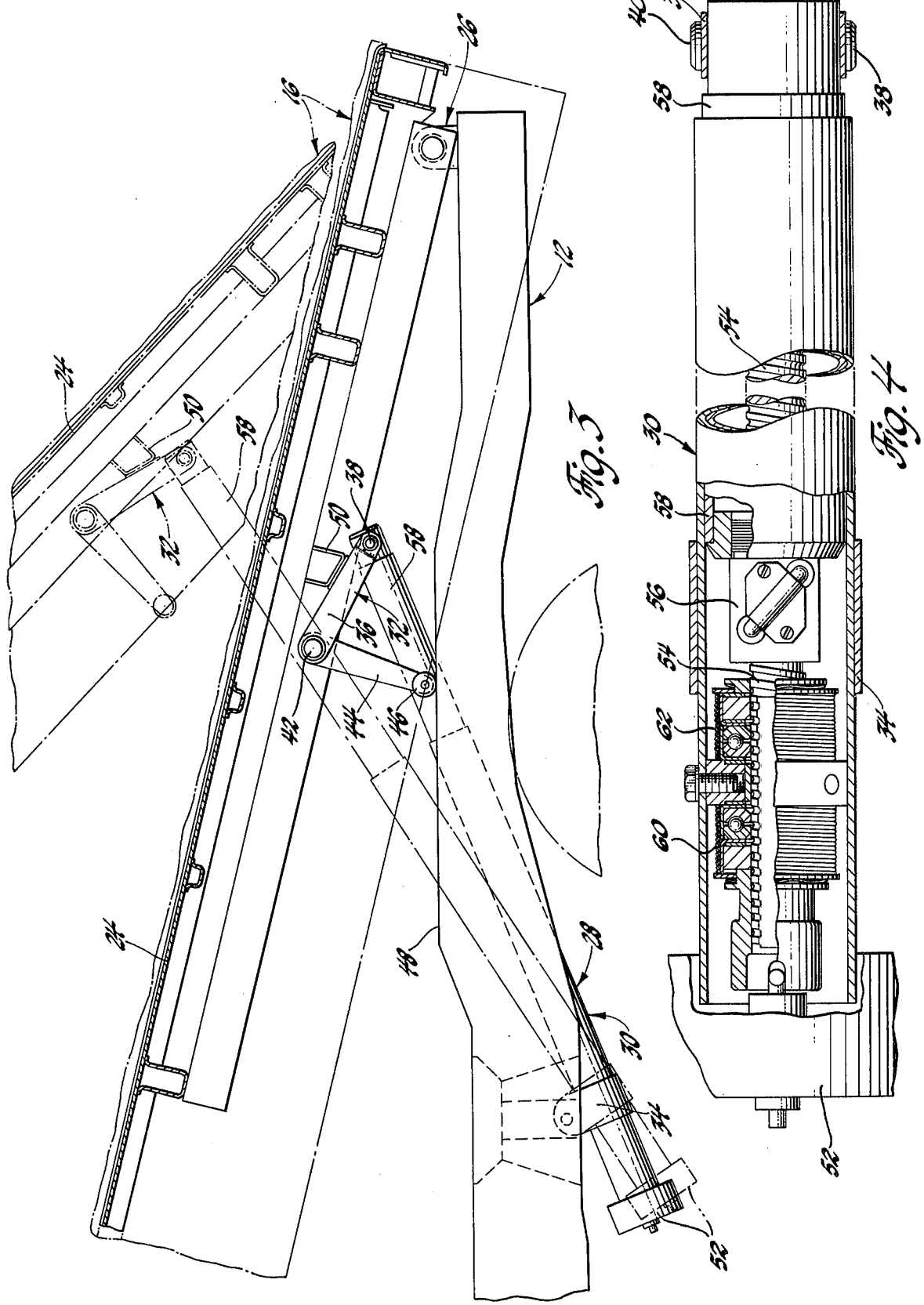

REAR DUMP OPERATING MECHANISM

The invention concerns dump trucks, in general, and more particularly an operating mechanism for raising the dump body of a truck about a horizontal pivot axis from a lowered-carry position to a raised-dump position.

In the preferred form, the operating mechanism, according to the invention, is combined with a vehicle having a frame which adjacent its rear end supports a dump body for pivotal movement about a transverse horizontal axis. The operating mechanism serves to pivot the dump body between a lowered-carry position and a raised-dump position and includes a bell crank member provided with a pair of arms. The bell crank member is carried by the dump body for pivotal movement about a transverse horizontal axis, and has one arm thereof provided with a roller while the other arm is pivotally connected to a substantially horizontally oriented ball-screw actuator supported by the frame. The roller cooperates with a guide track fixed to the frame so that during initial extension of the actuator, the bell crank provides the operating mechanism with a mechanical advantage. This occurs when the dump body is in the lowered position and the bell-screw actuator is initially extended so as to cause the bell crank to be rotated about its support means. During this time, the roller moves along the guide track and causes the dump body to be raised to a partially raised position after which the other arm of the bell crank contacts the underside of the dump body and the actuator is positioned at an improved angle for allowing the completion of the raising of the dump body to the fully raised-dump position.

The objectives of the present invention are to provide a new and improved operating mechanism for raising a dump body of a truck having limited ground clearance from a lowered-carry position to a raised-dump position; to provide an improved operating mechanism for use with a dump body of a light duty truck that utilizes an electrically driven linear actuator for raising the body to a dump position; to provide an improved operating mechanism for the dump body of a small truck that utilizes a ball-screw actuator combined with a ball crank and arranged so as to provide a mechanical advantage during the initial raising movement of the body; and to provide an improved operating mechanism for raising the dump body of a truck having low ground clearance that employs a linear actuator arranged with its longitudinal axis substantially parallel to the floor of the dump body when the latter is in a lowered-carry position and is connected to a bell crank member carried by the dump body that permits the initial extensible movement of the actuator to provide a lifting action on the dump body.

Other objectives and advantages of the present invention will be more apparent from the following detailed description when taken with the drawings in which:

FIg. 1 is a elevational view of a truck having a dump body operated by a mechanism made in accordance with the invention, FIg. 2 is an enlarged elevational view showing the operating mechanism incorporated with the truck of FIG. 1, FIG. 3 is a view similiar to FIG. 2, but shows the dump body in a partially raised-dump position and a fully raised-dump position and, FIG. 4 is an enlarged plan view with parts broken away showing the ball-screw actuator employed with the operating mechanism of FIGS. 1-3.

Referring to the drawings and more particularly FIG. 1, a truck 10 is shown having a frame 12 which supports an operator's cab 14 at the front end thereof and a dump body 16 at the rear end thereof. The dump body 16 is of the usual tailgate or open rear end type having side walls 18 and 20 as well as a front wall 22 which together with a horizontal floor portion 24 provides a box-like container structure for carrying soil, gravel, sand, or other material. The lower rear end of the dump body 16 is connected to the frame through the usual mounting member 26 which permits the dump body 16 to pivot about a transverse horizontal axis between the lowered-carry position shown in FIG. 2 and the fully raised-dump position shown in phantom lines in FIG. 3.

Movement of the dump body 16 between the aforementioned positions is provided by an operating mechanism 28 which as seen in FIGS. 1-3 includes a ball-screw actuator 30 and a bell crank member 32. The actuator 30 is pivotally mounted adjacent its rear end to the frame 12 of the truck by a bracket member 34 while the front or extensible end of the actuator is pivotally connected to an arm 36 of the bell crank member 32 through a pair of trunnions 38 and 40 as seen in FIG. 4. The bell crank member 32 is mounted to the lower subframe of the dump body 16 approximately midway between the ends thereof by a pivotal connection 42 which permits the bell crank member 32 to rotate about a transverse horizontal axis which is parallel to the pivot axis provided by the mounting member 26 about which the dump body is movable. The other arm 44 of the bell crank member 32 rotatably supports a roller 46 which, when the dump body 16 is in the lowered-carry position, contacts a horizontal track 48 formed on the frame 12.

As should be apparent from the above description and, as seen in FIG. 2 and 3, when the ball-screw actuator 30 is initially extended, the bell crank member 32 is rotated in a counterclockwise direction about its supporting pivotal connection 42 and causes the roller 46 to roll rearwardly along the track 48. As a result, the dump body 16 is raised upwardly about its pivotal connection provided by the mounting member 26. The bell crank member 32 continues to rotate in a counterclockwise direction with the roller moving rearwardly along the track 48 until the arm 36 engages a transverse channel-shaped member 50 secured to the subframe of the dump body 16. At this point and as seen in full lines in FIG. 3, the dump body 16 assumes a partially raised position, after which further extension of the actuator 30 causes the roller 46 to lose contact with the track 48 as the dump body 16 continues to pivot rearwardly about its support axis until it reaches the fully raised-dump position shown in phantom lines.

The ball-screw actuator 30 incorporated with this invention is driven by an electric motor 52 which receives its power from the electrical system of the vehicle. The motor 52 is of a reversible type so that when driven in one direction, the actuator 30 is extended and when driven in the opposite direction, the actuator is contracted. Ball-screw actuators of this type are commercially available and one example of such a device can be seen in FIG. 4. As seen in FIG. 4, the actuator 30 includes a screw 54 that is drivingly connected at its rear end to appropriate reduction gearing (not shown)

driven by the electric motor 52. A ball-nut member 56 having recirculating ball bearings provided therein is mounted on the screw 54 and is secured to an extensible tubular member 58, the forward end of which is provided with the aforementioned trunnion members 38 and 40. Thus, when the motor 52 is energized, the screw 54 is rotated about its axis causing the ball-nut member 56 to move to the right axially along the screw and extend the member 58 outwardly. When the motor is driven in the opposite direction the ball-nut member moves to the left along the screw to retract the member 58. The spring wound brake assemblies 60 and 62 prevent the screw 54 from rotating when the motor is deenergized, thus maintaining the selected position of the ball-nut member 56. Ball-screw actuators of this type are manufactured by the assignee of this invention and one similiar to the actuator shown in FIG. 4 is identified as Saginaw Steering Gear Division Part Number 5704834.

The above described dump body operating mechanism 28 permits small trucks, which normally are not provided with hydraulic systems, to have a dump body which can be operated by the electrical system of the truck. Due to the length of electrically driven actuators of the type incorporated with this invention, and the limited ground clearance available with small trucks, it is necessary to locate the actuator in a position where the longitudinal axis thereof is substantially parallel to the floor of the dump body. Such positioning limits the ability of the actuator to be connected to the dump body at an angle which provides efficient raising movement thereof. In this case, however, by utilizing the bell crank member, initial extensible movement of the actuator is transmitted through the bell crank member so as to cause raising of the dump body even though the path followed by the working end of the actuator is in substantially a horizontal direction. Thus, the bell crank member provides a mechanical advantage during the initial raising movement of the dump body.

Various changes and modifications can be made in this construction without departing from the spirit of the invention. Such changes and modifications are contemplated by the inventor and he does not wish to be limited except by the scope of the appended claims.

I claim:

1. In combination with a vehicle having a frame supporting a dump body for pivotal movement about a transverse horizontal axis, an operating mechanism for pivoting the dump body about said transverse axis between a lowered position and a fully raised position, said operating mechanism including a bell crank member having a pair of arms, means connecting said bell crank member to said dump body for pivotal movement about an axis parallel to said transverse horizontal axis, a track fixed to said frame and extending longitudinally thereof, one arm of said bell crank member adapted to move along said track, a linear drive transmitting means supported adjacent one end thereof by said frame and pivotally connected at the other end to the other of said arms, and a motor drivingly connected to said linear drive transmitting means, the arrangement being such that when the dump body is in the lowered position actuation of the motor causes the bell crank member to be rotated about its support means so that said one arm moves along the track and causes the dump body to be raised to a partially raised position after which said other of said arms contacts the underside of the dump body to complete the raising of the dump body to the fully raised position.

2. In combination with a vehicle having a frame supporting a dump body for pivotal movement about a transverse horizontal axis, said dump body comprising a pair of laterally spaced side walls, a front wall and a floor portion, an operating mechanism for pivoting the dump body about said transverse axis between a lowered position and a fully raised position, said operating mechanism including a bell crank member having a pair of arms, means connecting said bell crank member to said dump body for pivotal movement about an axis parallel to said transverse horizontal axis, a track fixed to said frame and extending longitudinally thereof, one arm of said bell crank member adapted to move along said track, a linear drive transmitting means supported adjacent one end thereof by said frame and pivotally connected at the other end to the other of said arms and located with its longitudinal axis substantially parallel to the plane of said floor portion when said dump body is in the lowered position, and a motor drivingly connected to said linear drive transmitting means, the arrangement being such that when the dump body is in the lowered position actuation of the motor causes the bell crank member to be rotated about its support means so that said one arm moves along the track and causes the dump body to be raised to a partially raised position after which said other of said arms contacts the underside of the dump body to complete the raising of the dump body to the fully raised position.

3. In combination with a vehicle having a frame supporting a dump body for pivotal movement about a transverse horizontal axis, an operating mechanism for pivoting the dump body about said transverse axis between a lowered-carry position and a fully raised-dump position, said operating mechanism including a bell crank member having a pair of arms, means connecting said bell crank member to said dump body for pivotal movement about an axis parallel to said transverse horizontal axis, a horizontal track located on said frame and extending longitudinally thereof, a roller rotatably supported by one arm of said bell crank member and adapted to roll along said track, a ball-screw actuator supported adjacent one end thereof by said frame and pivotally connected at the other end to the other of said arms, and an electric motor drivingly connected to said ball-screw actuator, the arrangement being such that when the dump body is in the lowered-carry position energization of the electric motor causes the bell crank member to be rotated about its support means so that the roller moves along the track and causes the dump body to be raised to a partially raised position after which said other of said arms contacts the underside of the dump body to complete the raising of the dump body to the fully raised-dump position.

* * * * *